(12) United States Patent
Ward

(10) Patent No.: US 11,643,984 B2
(45) Date of Patent: *May 9, 2023

(54) SYSTEM, APPARATUS AND METHOD FOR CLEAN, MULTI-ENERGY GENERATION

(71) Applicant: Marvin W. Ward, Bristow, VA (US)

(72) Inventor: Marvin W. Ward, Bristow, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/540,904

(22) Filed: Dec. 2, 2021

(65) Prior Publication Data

US 2022/0090546 A1 Mar. 24, 2022

Related U.S. Application Data

(63) Continuation of application No. 17/222,311, filed on Apr. 5, 2021, now Pat. No. 11,193,431, which is a
(Continued)

(51) Int. Cl.
| | |
|---|---|
| *F02D 29/06* | (2006.01) |
| *F01B 1/08* | (2006.01) |
| *F01B 1/10* | (2006.01) |
| *F01B 9/04* | (2006.01) |
| *F01B 17/02* | (2006.01) |
| *F01B 17/04* | (2006.01) |
| *F01B 23/10* | (2006.01) |
| *F01K 13/02* | (2006.01) |

(Continued)

(52) U.S. Cl.
CPC ............ *F02D 29/06* (2013.01); *F01B 1/08* (2013.01); *F01B 1/10* (2013.01); *F01B 9/042* (2013.01); *F01B 17/02* (2013.01); *F01B 17/04* (2013.01); *F01B 23/10* (2013.01); *F01K 13/02* (2013.01); *F01K 27/005* (2013.01); *F02M 25/032* (2013.01); *F02M 25/12* (2013.01); *Y02T 10/12* (2013.01)

(58) Field of Classification Search
CPC .... F01B 1/08; F01B 1/10; F01B 9/042; F01B 17/02; F01B 17/04; F01B 23/10; F01B 21/00; F01B 21/02; F01B 21/04; F01K 13/02; F01K 27/005; F02D 29/06; F02D 19/02; F02D 19/021; F02D 19/06; F02D 19/0602; F02D 19/0639; F02D 19/0642; F02D 19/0644; F02D 19/0663; F02D 19/0665; F02D 19/08; F02D 19/12; F02D 41/0025; F02D 41/0027; F02M 25/022; F02M 25/12; F02M 25/032; F02M 25/0221; F02M 25/038; F02M 25/10; F02M 21/02; F02M 21/0203; F02M 21/0206; F02M 21/0218; F02M 21/0221; F02M 2700/12; F02M 2700/123; Y02T 10/121; Y02T 10/12

See application file for complete search history.

(56) References Cited

U.S. PATENT DOCUMENTS

| | | | | |
|---|---|---|---|---|
| 3,608,529 A | * | 9/1971 | Smith | .............. F02B 47/00 123/25 C |
| 2009/0056670 A1 | * | 3/2009 | Zhao | .............. F02B 41/06 123/26 |

* cited by examiner

*Primary Examiner* — Mickey H France
(74) *Attorney, Agent, or Firm* — Raymond Van Dyke; Van Dyke Intellectual Property Law

(57) ABSTRACT

Systems, apparatuses and methods in interoperating with multiple clean energy sources, such as pneumatic energy, electrical energy, hydrogen energy and steam energy, with engine configurations employing theses clean energy sources dynamically and synchronously. Further embodiments including fossil fuel energies.

14 Claims, 14 Drawing Sheets

Related U.S. Application Data continuation of application No. 17/027,212, filed on Sep. 21, 2020, now Pat. No. 10,968,843, which is a continuation of application No. 16/120,426, filed on Sep. 3, 2018, now Pat. No. 10,781,759, which is a continuation of application No. 12/929,371, filed on Jan. 19, 2011, now Pat. No. 10,066,556.

(60) Provisional application No. 61/282,303, filed on Jan. 19, 2010.

(51) Int. Cl.
*F01K 27/00* (2006.01)
*F02M 25/12* (2006.01)
*F02M 25/032* (2006.01)

SYSTEM, APPARATUS AND METHOD FOR CLEAN, MULTI-ENERGY GENERATION

CROSS REFERENCE TO RELATED APPLICATIONS

The present invention claims priority from U.S. patent application Ser. No. 17/222,311, filed Apr. 5, 2021, now U.S. Pat. No. 11,193,431, which is a continuation of U.S. patent application Ser. No. 17/027,212, filed Sep. 21, 2020, now U.S. Pat. No. 10,968,843, which is a continuation of U.S. patent application Ser. No. 16/120,426, filed Sep. 3, 2018, now U.S. Pat. No. 10,781,759, which is a continuation of U.S. patent application Ser. No. 12/929,371, filed Jan. 19, 2011, now U.S. Pat. No. 10,066,556, entitled "System, apparatus and method for clean, multi-energy generation," which claims priority from U.S. Provisional Patent Application Ser. No. 61/289,980, entitled "Advance Multi-Energy Operating Engine and Internal Clean Energy Generation," filed Jan. 19, 2010, the subject matters of which are incorporated by reference herein.

FIELD OF THE INVENTION

The present invention addresses improvements in engine design and operation, and also to efforts for such devices to conserve energy, and use (and reuse) resources efficiently, preferably clean energy resources.

BACKGROUND OF INVENTION

Since James Watt's improvements in steam generation in the Industrial Age and particularly with the employment of fossil fuels over the past century, mankind has been dramatically increasing the consumption of energy, and as a consequence changing the environment. With the rise of China and other nations with large populations, all desirous of attaining higher standards of living, dependent upon fossil fuel consumption, the ecological damaging effects to the Earth are accelerating and the environment is under siege. Solutions are sought to remedy and alleviate these consequences. Although non-fossil fuel alternatives are available, economic considerations thwart immediate large scale exploitation of cleaner energy generation sources.

The push for non-fossil fuel alternatives continues, with developments along a variety of fronts, e.g., solar and wind power generation. With the advent of microprocessors and computers, along with new and stronger materials, however, other mechanisms are increasingly possible to shift from fossil fuels to renewable and cleaner forms of energy, such as by improving tried and true technologies, e.g., steam and pneumatic energies. For example, developments in metallurgy and components engineering have produced materials of great strength, enabling better control of steam, pneumatic or compressed air and other energy sources. Newer technologies are possible also, such as the control of hydrogen gas as an energy source. These three sources are deemed clean to the environment and improvements in their usage are a main thrust of the instant invention.

Indeed, clean energy has become a driving force for economic recovery in the United States (and elsewhere) and is being adopted as the energy type to overcome current use levels of fossil fuels. Steam power, the basis for the Industrial Revolution thanks to Watt, remains the principal means for generating electricity, e.g., through larger steam turbines and in long-haul ocean shipping. The sharp decline in usage of steam power over the past seventy-five years was due in part to the lack of advanced technologies to make steam economical and keep abreast of increased environmental standards. With improved new materials and other advancements in computer technologies to efficiently manage engine operation and performance, a new revolution is at hand and the present invention is at the forefront of these developments.

With clean energy investment rising and price projections on the technologies decreasing, engines and systems capable of taking better advantage of clean technologies will become quite valuable. The instant invention is directed to improvement of the carbon footprint, by minimizing or eliminating fossil fuel usage, and making devices that are environmentally clean with zero pollutants emitted during operations.

The instant invention also addresses reducing costs of operation through employment of closed-loop energy systems with monitoring of heat, flow and load, and feedback to guarantee and sustain efficient operation over long intervals and in a variety of applications.

The instant invention permits the employment of diverse clean energy sources together or individually, and provides for recovering and recycling any residual or unused energies deployed.

To fully exploit the advantages in developing clean technologies, the equipment and constituent device parts should be modular in design, with parts commonality permitting ease of assembly and disassembly, thereby achieving additional gains, and enable clean technologies to compete with fossil fuels.

SUMMARY OF THE PRESENT INVENTION

The system, method and apparatuses of the present invention are directed to the employment of multiple, preferably clean, energy sources in engine operations, including mechanisms for the utilization of each energy source within an engine, either individually or in concert with other energy sources. In addition to clean energy sources, such as steam, compressed air and hydrogen, the present invention may also include fossil fuels in the engine configurations, creating an engine and methodology for the synchronous consumption of disparate energy sources within a single engine or system.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Drawings, where like reference numerals designate like structural and other elements, in which:

DETAILED DESCRIPTION OF THE PRESENT INVENTION

The present invention will now be described more fully hereinafter with reference to the accompanying Drawings, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

Figures 1A, 1B, 1C:
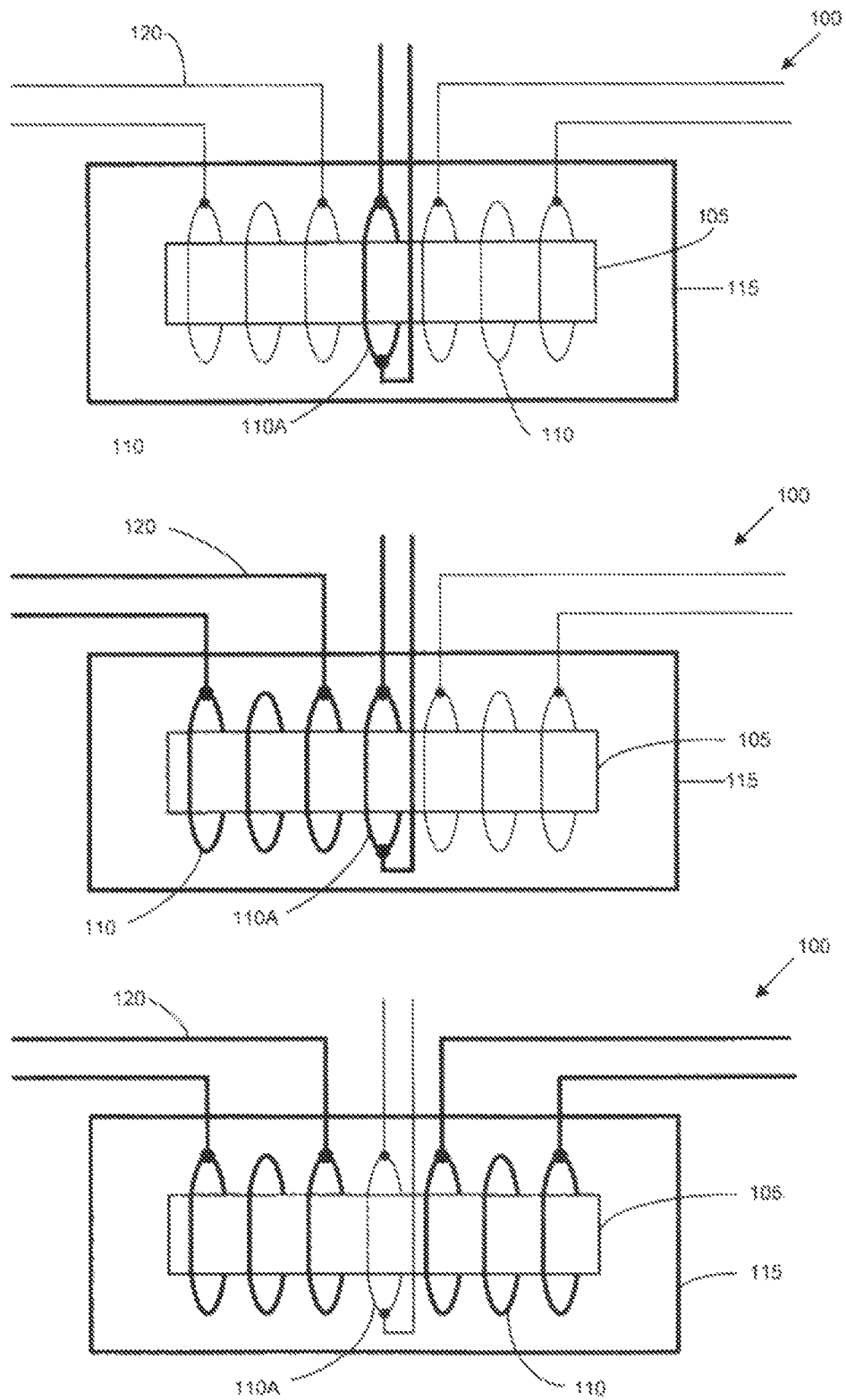
FIGS. 1A, 1B and 1C are representative view views of an induction coil heating apparatus, with FIG. 1A illustrating an idle condition, FIG. 1B illustrating an intermediate position, and FIG. 1C representing a maximum position.

With reference now to FIGS. 1A, 1B and 1C of the Drawings, there is illustrated a mechanism for heat transference employing conventional principles of induction, e.g., using electricity in heating a liquid, such as water. With particular reference to FIG. 1A, there is illustrated an initial position or stage for induction heating, generally designated by the reference numeral 100, such as may be employed in maintaining a minimum of steam power at all times during an engine idle condition. In this fashion, energy may be conserved by maintaining a lesser amount of steam generation. As shown in FIG. 1A, a bar, e.g., a steel rod, designated by the reference numeral 105, is encircled by a number of windings, designated by the reference numeral 110. In this idle embodiment 100, only one winding, an idle winding designated by reference numeral 110A, is energized, such as by inducing radio frequency energy through the winding 110A alone. The bar or rod 105 thereby transfers the generated heat energy to a surrounding liquid, such as water, maintaining a minimal level of such heating within an induction chamber, vault or other container vessel, generally designated by the reference numeral 115, such as a water-to-steam gas conversion cell described in more detail hereinbelow.

Induction heating is a well-known technology and is used in various industrial applications, such as welding, brazing, melting (such as in a furnace), cooking and heat-treating applications. In particular, induction heating is a non-contact process that uses a high-frequency alternating magnetic field to induce eddy currents in a conducting metal, such as the bar 105 or other work piece. These eddy currents then give rise to Joule heating when these currents flow through the resistance of the metal. Additionally, the applied high-frequency AC causes a skin effect, which tends to confine the eddy current flow to the surface of the metal, thereby increasing the effective resistance and causing more heating. Furthermore, in ferrous metals as well as some types of steel, below the Curie temperature there is yet another heating mechanism due to the friction of the magnetic domain field "flipping," which is known as hysteresis loss, which is greatest for materials of high magnetic permeability, such as iron. All three effects may combine to quickly elevate the temperature of the work piece to many hundreds of degrees Celsius.

It should be understood that the windings 110 may be made of copper or other such conductive material wound to form an induction coil over the bar 105. The radio frequency energy or other energy to induce the induction heating may be injected via inputs, such as the wires shown in FIGS. 1A, 1B and 1C and generally designated by the reference numeral 120. As will be described in more detail hereinbelow, the heat transferred to the liquid is employed for work.

With reference now to FIG. 1B of the Drawings, there is illustrated an exemplary embodiment generating more heat than the idling of FIG. 1A. In particular, in this configuration, one half of the remaining windings 110 (those left of idle winding 110A) are energized with the aforementioned radio frequency energy input through the wires 120. The increased number of energized windings generates increased induced heat output from the bar 105, thereby raising the temperature of the ambient fluid. This stage therefore represents an intermediate stage for the production of steam energy.

It should of course be understood that with a larger number of windings, fine gradations for heating are possible, and a number of intermediate states are possible. Of course, should the engines described herein require more steam pressure or energy, such as increases in engine speed or torque or other demands, then a particular number of the windings can be employed to meet the need, with the inputs or wires 120 controlled by a computer or microprocessor, as discussed in more detail hereinbelow.

With reference now to FIG. 1C of the Drawings, there is illustrated therein an embodiment where high temperatures are needed, i.e., all of the windings 110 are energized, particularly those both left and right of idle winding 110A, thereby heating the ambient liquid to a higher temperature and causing a greater amount of the liquid to reach boiling temperature, thereby converting more of the liquid to steam energy. As shown in this embodiment, the idle winding 110A is only energized when idling. It should, of course, be understood that the idle winding 110A in other embodiments may be energized at all stages, thereby enabling more heat transference into the induction chamber or vault 115.

Induction heating, as described hereinabove, is a very efficient method for heating a bar 105, such as an iron core metal, to generate steam energy quickly. With multiple windings 110, sensors and computerized control, the amount of steam in the vault 115 can be adjusted dynamically. In this fashion, the steam may be kept at a minimal setting using idle winding 110A and ramped up to maximum dependent upon the engine loads, which will be described.

Figure 2:
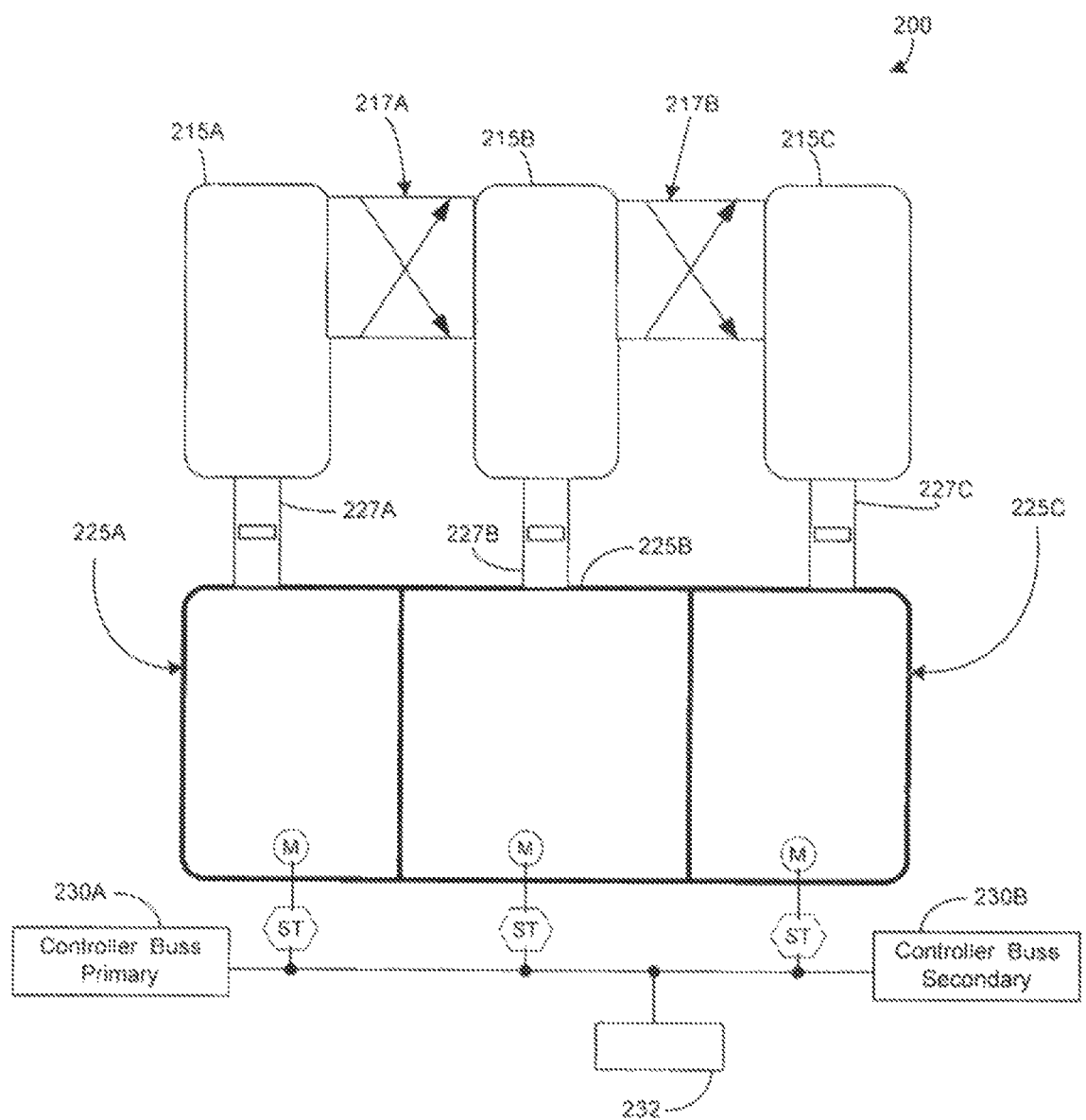
FIG. 2 illustrates the apparatus of FIGS. 1A, 1B and 1C in more detail, illustrating monitoring and processor control of the apparatus and system.

With reference now to FIG. 2 of the Drawings, there is illustrated an implementation of the induction heating apparatus described in connection with FIGS. 1A, 1B and 1C with microprocessor controls and generally designated by the reference numeral 200. With reference to FIG. 2, there are shown three interconnected induction chambers or vaults, designated by the respective reference numerals 215A, 215B and 215C with cross-flow valves 217A and 217B generally designated therebetween, which equalize the temperatures and pressures among the chambers. The three chambers 215A, 215B and 215C are preferably connected to respective staging vaults 225A, 225B and 225C, respectively, via connectors 227A, 227B and 227C, respectively.

Also shown in FIG. 2 are a controller bus primary processor and a controller bus secondary processor, designated by the reference numerals 230A and 230B, respectively, the processors referred to generally by the reference numeral 230. As discussed, the engine requirements vary depending on demand and other factors, and an object of the present invention is to take more advantage of precision controlling to regulate the various energy source and functionalities of the present invention. For example, in this embodiment the processors or controllers 230 regulate the flow of steam from the various vaults 225 to the engine, supplying the required steam energy demands of the engine by finely regulating the induction process. It should be understood that the symbol "M" within each of the vaults 225A, 225B and 225C represents a means of metering the cubic feet of steam pressure in virtual real time that passes from each said vault 225. This metering information provides telemeter information to the controlling processor, telling the exact flow information, which is, in turn, preferably forwarded to a master controller, e.g., to a so-called steam demand processor, generally designated by the reference numeral 232.

In this manner, the respective induction heaters 215 are evenly operated in a synchronous mode to provide the needed amount of steam to the respective vaults 225 for supply to the engine. All of this, with the aforementioned processor control, is done smoothly, with regulation of the respective electrical windings 110 and on-and-off controls wired to the induction heating system, configurations of which are set forth in FIGS. 1A, 1B and 1C. It should be understood that the vaults 215 and 225 are sized to accommodate sufficient steam demands of the engine, and are balanced by number and size of induction coils that can be engaged or disengaged within milliseconds to throttle up (and down) for additional steam supply. With reference again to FIG. 2, it should be understood that the symbol ST represents a steam trap that prevents steam back pressure from flowing in reverse (from the engine back to the vaults 225) and governs the requisite steam energy passing to the engine pursuant to processor 230 and/or 232 controls.

Figure 3:
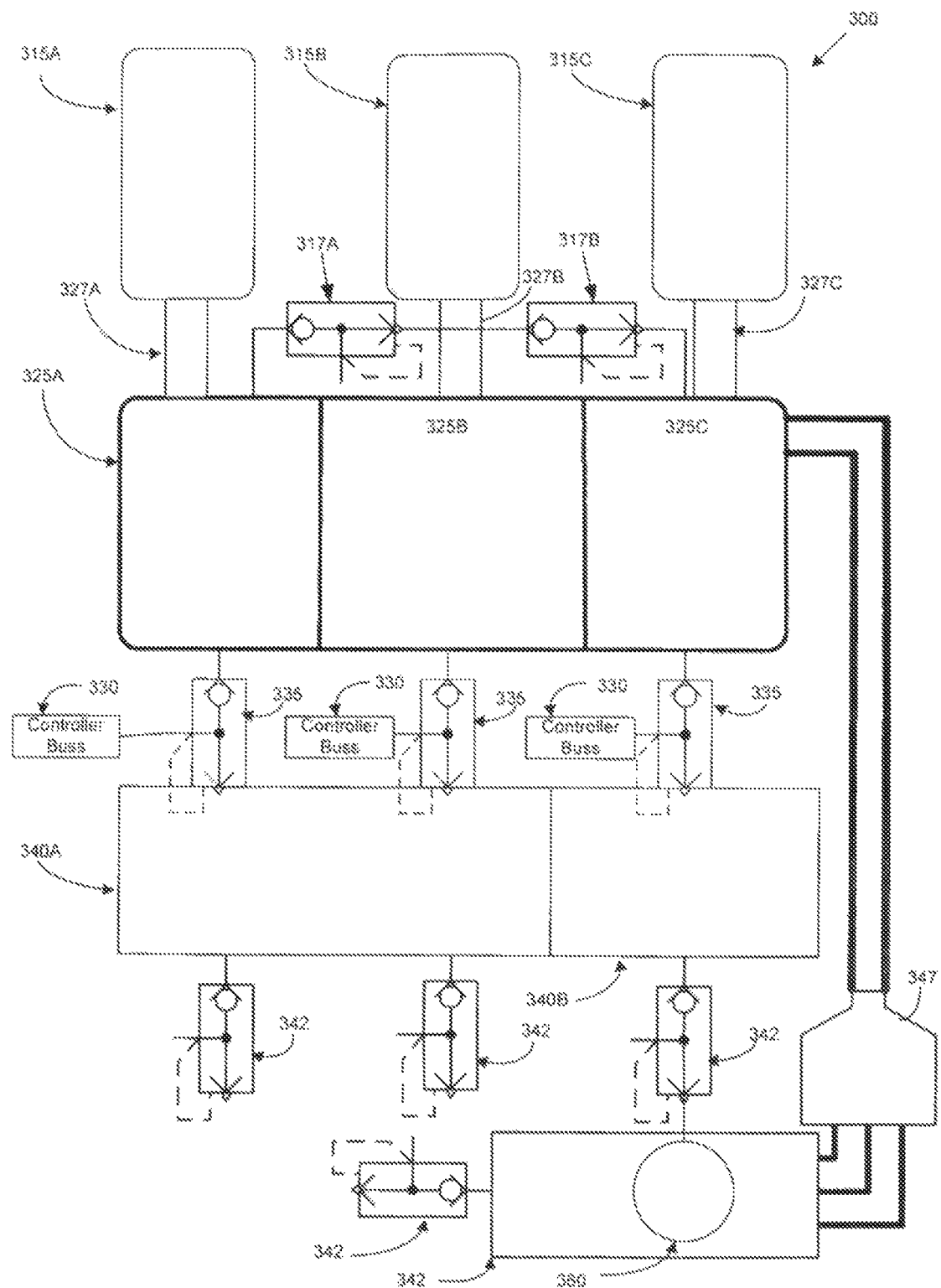
FIG. 3 illustrates various operational elements in a steam generation embodiment of the present invention, employing the apparatuses of FIGS. 1A, 1B and 1C and 2.

With reference now to FIG. 3 of the Drawings, there is illustrated an implementation of the induction apparatus of FIGS. 1A, 1B and 1C, along with the processor controls of FIG. 2 and emergency measures, all generally designated by the reference numeral 300. As discussed, induction chambers 315A, 315B and 315C supply induction-produced steam to vaults 325A, 325B and 325C, respectively, via connectors 327A, 327B and 327C, respectively. Here, cross-flow values 317A and 317B regulate the pressure between the vaults 325 and keep even pressure therebetween, as described hereinabove.

Steam is thereby stored in all three vaults 325, each being equipped with emergency release valves 335 controlled by a system microprocessor (such as processor 230 or 232) through three individual controller busses 330 shown. As further illustrated, the emergency steam release valves 335 connect to emergency stage relief chambers, generally designated by the reference numeral 340A, which serve as emergency gas/fluid quick exhaust relief measures to prevent explosions and contain overpressures. The chambers 340A, in turn, have emergency gas/fluid/steam release valves, designated by the reference numeral 342. Also shown in FIG. 3 is another gas/fluid quick relief chamber or tank, designated generally by the reference numeral 340B.

With further reference to FIG. 3, there is illustrated therein a spent steam pressure chamber, designated by the reference numeral 345, within which all spent low pressure and cooled steam is collected. For example, the overflow from the aforementioned quick relief tank 340B feeds overflow "new" or unused steam that may bleed off the vaults 325 and be collected into this stage for further work via another release valve 342 interconnecting the tank 340B and chamber 345. In addition, steam forwarded from the vaults 325 to the engine, generally designated by the reference numeral 347, is collected after use to replenish the spent steam pressure chamber 345. In this manner, the chamber 345 collects spent steam resulting from operation of the engine 347, and can also be supplemented with new steam, such as the new steam bleed off pressure valve operations, as described hereinabove. The chamber 345 has an emergency relief value 348 also. Also shown in the figure is a turbine 360 operable to utilize the spent steam energies, and thereby power devices and attachments with the electricity generated therefrom, further recycling and conserving resources.

Figure 4:
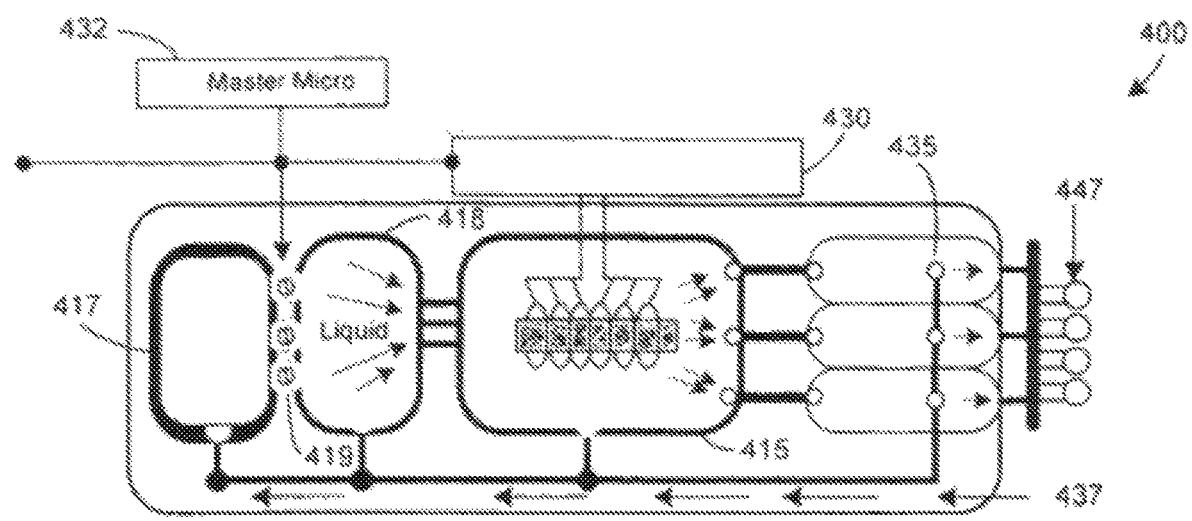
FIG. 4 further illustrates operations of a steam generator embodiment of the present invention, as depicted in FIGS. 1-3.

The aforementioned exemplary description illustrates background information and configurations relevant to the production, storage and implementation of one source of energy employed in practicing the present invention, i.e., steam energy generation. With reference now to FIG. 4 of the DRAWINGS, there is illustrated a system providing this steam power or energy to an engine, the system generally designated by the reference numeral 400. As shown, induction heating is done within a steam boiler bowl or vault, designated by the reference numeral 415, and transferred to respective staging chambers or vaults 425, as described in FIG. 3, and the energy is then transferred, as needed, to the engine via engine outputs 447. As described in FIG. 3, release or overflow valves, generally designated by the reference numeral 435, take excess steam energy away from the vaults 425 via an energy release mechanism, generally designated in FIG. 4 by the reference numeral 437, routing any excess or unused steam back to the steam boiler bowl 415 if the steam is sufficiently hot, heating the liquid therein. Alternatively, the energy release mechanism 437 can route the unused steam energy to a chiller bowl 417 or a liquid tank 418, as illustrated. As shown, the returning steam can be chilled within the chiller bowl 417 and then transferred as a liquid to the liquid tank 418 for subsequent transfer to the induction chamber 415. Of course, if the steam from the staging chambers 425 has condensed within the energy release mechanism 437 by the time it reaches the connection to the liquid tank 418, the fluid can be injected there instead of proceeding to the chiller bowl 417 for such condensation, thereby conserving energy. Operational control of this energy conservation mechanism 437 is accomplished by a master controller 432 or a processor or dedicated controller, as described.

It should be understood that a feature of the instant invention is the conservation of steam (and other) energy by recirculating and reusing unspent energies. With further reference to the system 400 of FIG. 4, a master (or other) controller 432 initiates induction heating of the liquid or water within the vault 415 (or water-to-steam gas conversion cell), pursuant to engine demands, drawing upon fluids from the chiller bowl 417 and liquid tank 418 as needed, and governing the pressures therebetween, e.g., via pressure valves 419. A controlled amount of steam is thereby produced, collected and routed to respective components of an engine, particularly, one or more cylinder/head combinations described in more detail hereinbelow.

Figure 5:
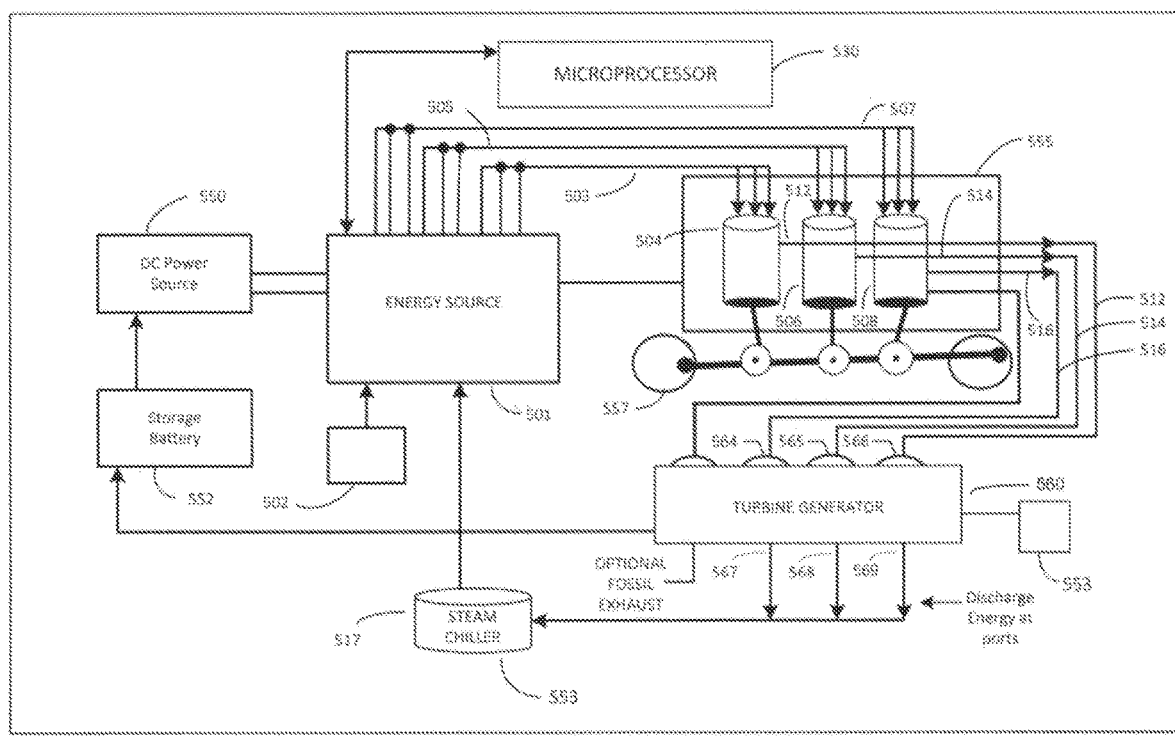
FIG. 5 is a representative diagram of an engine pursuant to the present invention, employing multiple energy sources.

With reference now to FIG. 5 of the DRAWINGS, there is illustrated an overall diagram of an embodiment of the present invention, directed to the cogeneration of various types of clean, sustainable energy, such as steam, to do work, as described thusfar. The system, generally designated by the reference numeral 500, has a means to supply energy, designated by the reference numeral 501. As described thusfar in FIGS. 1-4, steam energy may be employed to supply power to the engine. As will be described further hereinbelow, other forms of energy can also be cogenerated, such as employing hydrogen and pneumatics, both clean and sustainable energies. Although an object of the present invention is to move toward improvements for the enhanced employment and deployment of renewable and clean types of energies, the present invention may also employ fossil fuels, e.g., diesel, as an emergency or backup power source or alternate power source. As described, the generation of these energies is under precision control of a processor 530, and the process initiated by a power source 550, such as a direct current (DC) power source, as is conventional in the art, with long-term storage of this electrical energy in a battery 552.

With further reference to the general features of the present invention set forth in FIG. 5, the processor-controlled release of the energies, whether steam, hydrogen gas, compressed air or fossil fuels, drives dedicated pistons, an assembly of which is generally designated by the reference numeral 555, either together or separately, and when coupled to a transmission 557 this performs work. These energies also drive a turbine (here a three-port turbine) 560 to generate electrical energy across a charge line 553 to charge the battery 552. As with the earlier embodiments, a steam chiller 517 may be employed to recover spent or unused steam energy, redirecting and recirculating the steam or condensate into the aforementioned energy supply means, particularly for steam generation. As will be described hereinbelow, spent and unused hydrogen and pneumatic energies are also captured and redirected for use. In this manner, energies otherwise lost to the environment are recycled in a similar way to the Rankin cycle. As described, the processor or processors 530 controls the energy production, as well as actuating control valves and monitoring various sensors to guarantee efficient engine system timing and coupling of the disparate energy sources in this embodiment to the piston assembly 555.

As mentioned, energy supply 501 cogenerates various sustainable energies to the aforedescribed pistons 555. In particular, the aforementioned steam energy is forwarded from the energy supply 501 via a line 503 to a piston 504 within the piston assembly 555, where the steam energy powers the operation of that piston 504. Similarly, as described hereinabove, additional sustainable energy forms may be provided to the piston assembly 555, such as hydrogen, which is forwarded by the energy supply 501 via a line 504 to another piston 505 within the piston assembly 555, and pneumatic energy is forwarded by the energy supply 501 via line 507 to piston 508, as illustrated, providing three sources of clean and sustainable energy. As discussed, the respective energies also drive turbine 560.

As shown in FIG. 5, turbine 560 has three ports to receive the respective energies. In particular, input port 564 receives the pneumatic power from the piston 508 across a line 516, and the turbine 560 outputs the energy, such as in the form of electrical energy, via line 567 to charge line 553, as discussed. Another input port 565 receives the hydrogen power from the piston 506 across the line 514, and the turbine outputs the energy via line 568 to charge line 553. Finally, input port 566 receives the steam energy from the piston 504 across line 512, and the turbine outputs the energy via line 569 to the charge line 553.

It should be understood that the improved configuration of the present invention wastes little or no generated energy, and attempts to recover, use and reuse all sources of generated steam, as well as other energies. For example, the system 500 is equipped with a highly-efficient steam operated electric generator 560 to provide a high portion of the electrical energy required to operate all electrical devices engaged to operate and control the engine. It should be understood that the steam driven turbine generator 560 provides a large percentage of the electricity required for various electrically-driven devices within the system 500 and connected thereto, e.g., the turbine 560, processors 530, sensors, and any other devices attached to the system, e.g., a pneumatic compressor to supply compressed air. The turbine 560 employed in the instant invention is unique to have three sources of clean energy to power its operation, i.e., steam, compressed air and hydrogen to ensure the system 500 can be nearly self-sufficient electrically. It should, of course, be understood that the turbine 560 may also employ fossil fuels.

As is understood, large industrial complex steam engines and related power sources are designed to be self-sufficient and provide new, preferably clean energy. Solar panels or wind power, generally designated by the reference numeral 563, may, therefore, be employed as the primary energy source during daylight hours. A large industrial solar array or wind farm 563 can provide ample power to generate the amount of steam required to produce large amounts of electrical energy. A large steam engine application could be supplemented by commercial electricity, designated generally by the reference numeral 502. Several solar array panels can generate sufficient power during daylight hours to allow the storage of steam-generated power to last during non-daylight hours. Optionally, the system 500 can be equipped with a steam-driven turbine only, and this method of supplying primary power source coupled with solar panels 563 that power the system during daylight hours. The solar array 563 can thus be the primary source during this period and the steam turbine supplements the battery 552 supply during non-daylight hours. Of course, a wind farm embodiment 563 generates power sporadically, dependent upon environmental factors. A large industrial operation, however, may employ wind power to use the energies so produced, store the energies in the battery 552 or like storage devices, and/or share the excess energies, e.g., sell the energies so produced to commercial electrical companies 502.

It should also be understood that the engine system 500 may be equipped with an electrical power controller with the generation of power being done with AC voltage and current as the primary source. Storage in batteries 552 is required, and is preferably accomplished through a highly efficient AC/DC converter. Battery power storage is preferably done through state-of-the-art DC voltage storage cells. In a preferred embodiment, this battery source of voltage is highly regulated to ensure the source is never below 50% depleted. When very high demands are placed upon the engine induction heating coils 110 to generate large amounts of steam, the back-up battery pack 552 cuts into the circuit and supplements the overall demand for the higher current flow increase in the system 500.

Figure 6:
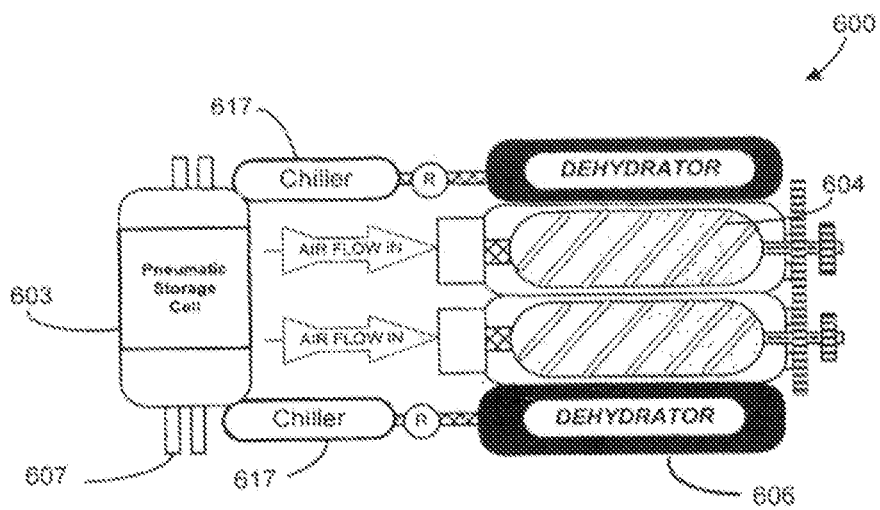
FIG. 6 illustrates operational elements in a pneumatic energy generation embodiment of the present invention.

With reference now to FIG. 6 of the DRAWINGS, there is illustrated therein another embodiment of the present invention utilizing compressed air as an energy source. Compressed air, known as pneumatic energy, is another clean, cogenerated energy employed in the practicing the present invention.

The compressed air is stored with a storage cell 603 and fed to a chamber 604 within which the compressed air is ready for injection into an engine for work. The spent compressed air is then dehydrated by a dehydration means 606 and forwarded to a chiller 617, condensing the gas, before being recirculated to the storage cell 603. Pressurized air is provided via inputs 607 and connection to a pneumatic compressor, such as an auger type, or other means to supply the pressurized air or gas, described in more detail hereinbelow.

It should be understood that pneumatic energy can be generated within the embodiment 600, as by induction in the steam implementation, i.e., by a pneumatic compressor connected to port 607. However, since an operable pneumatic compressor requires electrical energy, it is preferable that employment of pneumatic energy in the present invention be coupled with another form of energy generation, i.e., the aforementioned steam, hydrogen or a fossil fuel, which can also generate the requisite electrical energy to drive the pneumatic compressor 617 and supply the needed pressurized air.

It should further be understood that compressed air can also be employed for cooling for the engine, as well as the compressor, an electric generator producing electrical power to charge the batteries and any other equipment or devices warmed by operation, as described in more detail hereinbelow. Further, as with spent steam, all spent pneumatic energy is preferably recycled or routed through a channel or duct to drive a turbine generator, conserving and reusing those energies, and further assisting in the charging of the batteries 552.

Figure 7:
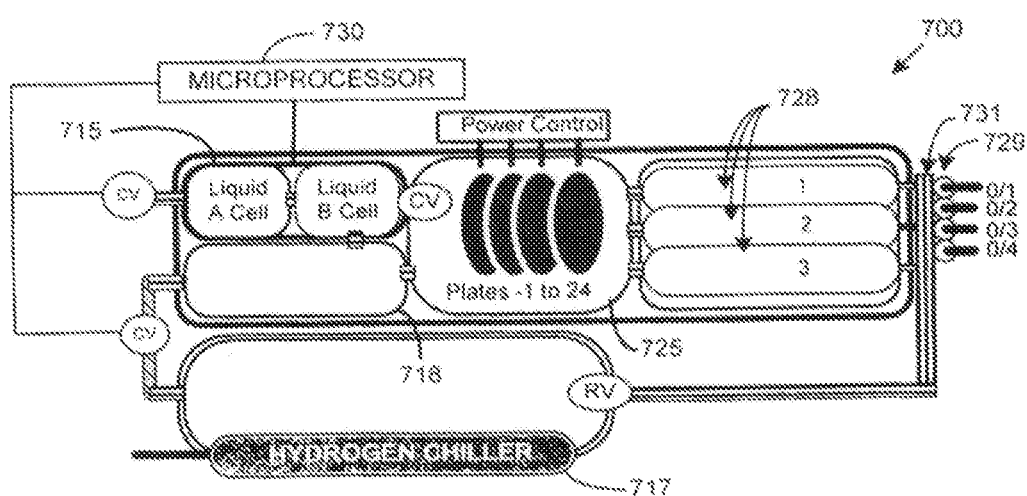
FIG. 7 illustrates operational elements in a hydrogen energy generation embodiment of the present invention.

With reference now to FIG. 7 of the DRAWINGS, there is illustrated a further clean energy source embodiment of the present invention, i.e., hydrogen. At present time, the technology in this embodiment is subject to rapid improvements. As with steam and pneumatic energy, hydrogen is a green and non-polluting fuel. As shown in FIG. 7, water is stored in tanks or cells 715, and, via processor 730 control, a measured amount is supplied to a hydrogen generator cell 725. Within the cell 725, there are a number of separated plates 727 all connected to an electrical current or DC power and surrounded by an ionic solvent or medium conducive to electrolysis. As is known, an electric current passing through an ionic medium results in chemical reactions along the electrodes, e.g., the plates 727, and provides a mechanism for the separation of materials within the ambient liquid or electrolyte, such as the generation of hydrogen gas from water. The aforementioned processor 730, via sensors, determines the amount of hydrogen required for engine operation, and actuates a given number of the plates 727 with a measured current. It should be understood that direct current provides the requisite energy to create or discharge the ions in the electrolyte that occurs when the electrodes are so energized. The electrode elements, which may constitute the plates 727 or portions thereof, are preferably made of metal, graphite and/or semiconductor material.

Once the hydrogen is formed within the cell 725, the gas proceeds through ports to a hydrogen gas hold stage, generally designated by the reference numeral 728, and made available to the cylinder head of the engine for work via hydrogen injector ports 729. The amounts of hydrogen so injected are governed by the controller 730. Unused hydrogen may be ported from the cylinder head via a conduit 731 to a hydrogen chiller 717, as shown in FIG. 7. The chiller 717 reprocesses the unused or spent hydrogen into clean liquid or water, and keeps the hydrogen stored therein cold. A recovery cell 718 is also shown, which communicates with the cells 715 and 725 and the chiller 717 assists in recovery of the hydrogen energies.

It should be understood that proper storage of hydrogen, a highly flammable gas, is a necessary facet of hydrogen energy usage. For example, a mechanical circular hydrogen tank is best located underground, where a colder environment can both protect and conserve energy. Engine operating supply is accomplished through routing hydrogen energy from below ground to a smaller storage sphere, which will have connections or protected lines to feed the generated or stored hydrogen fuel to engine cylinder and piston assemblies, e.g., via connection to the injector ports 729.

Figure 8:
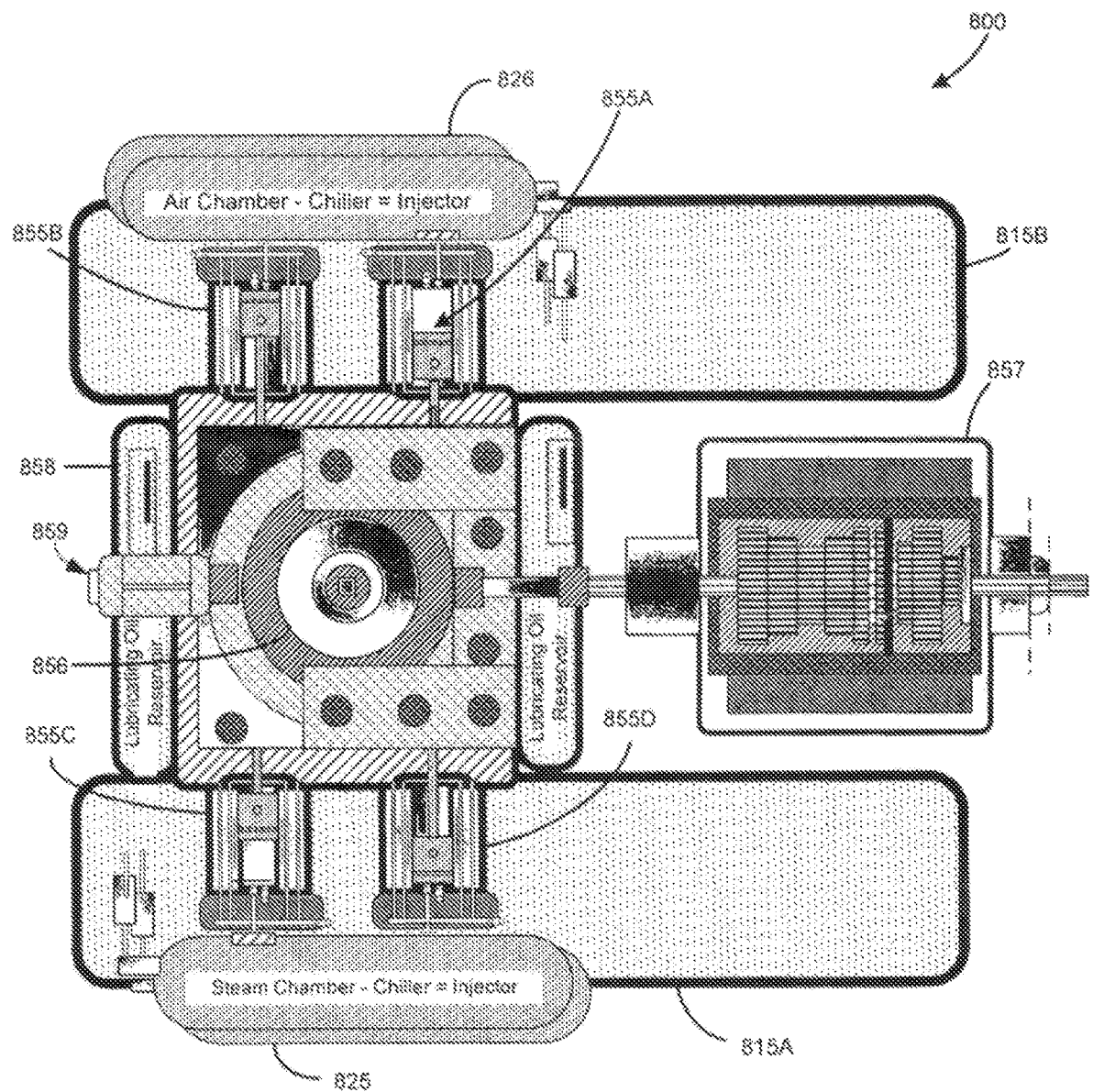
FIG. 8 is a bottom view of a four cylinder engine embodiment of the present invention, illustrating the simultaneous deployment of steam and pneumatic energies.

With reference now to FIG. 8 of the DRAWINGS, there is illustrated a four cylinder, piston engine, generally designated by the reference numeral 800, employing the principles of the present invention, particularly a bottom view of the configuration. As illustrated in FIG. 8, the engine configuration 800 has a steam boiler or vault and a compressed air boiler or vault, designated by the reference numerals 815A and 815B, respectively, both flanking the cylinder head, designated by the reference numeral 856. Also shown is an automatic transmission 857, lubricating oil reservoirs 858 flanking the cylinder head 856, and an engine starter 859. As illustrated, the four piston assemblies, designated by the reference identifiers 855A, 855B, 855C and 855D are disposed about the cylinder head 856, and utilize varying energy sources to supply the engine 800. For example, piston assemblies 855A and 855B are connected to a pneumatic system 826, such as shown and described in connection with FIG. 6, and piston assemblies 855C and 855D are connected to a steam generating system, such as shown and described hereinabove in connection with FIGS. 1-4. In particular, the piston assemblies are shown in typical alternating piston action, with the pistons 855A and 855C in down stroke, and pistons 855B and 855D in upstroke, due to gearing connections describe in more detail hereinbelow. It should be understood that although only two energy sources are described in this exemplary embodiment, each piston 855 may fire independently of the other three with an alternate power source. Indeed, each piston assembly 855 can fire with differing power sources or be combined with any pairings of the others, as described further hereinbelow.

It should be understood that another feature of the present invention is the employment of modular designing, which permits multiple energy operating cylinder piston stages, multiple type fossil fuels, electric hydrogen energy, pneumatic energy and steam energy to be selected automatically or manually. The modularity makes operations and maintenance more efficient with more interchangeable components. Furthermore, the present invention operates the engine having four cylinder heads and pistons within one or more engine embodiments using one or more of the same energy types, including multiple type fossil fuels, electric hydrogen, pneumatic and steam energy. Since the engine preferably employs a modular design, this permits some energy production units (pistons and cylinders) to operate, while others are idle or perform other work, e.g., driving attachments to generate electrical energy, pneumatic energy, electric hydrogen or steam energy, and steam generators for generating and storing electrical power used to supply power supply voltages for the aforedescribed induction heating, dielectric heating or AC electric phase bucking-type heating, all capable to supply electricity to generate required steam energy, electric hydrogen energy and pneumatic energy.

In other words, unlike conventional engines where all pistons act in concert to one end, i.e., the consumption of gasoline to provide torque, the modularized improvements of the present invention, with improved controls, permit system multitasking, e.g., three piston assemblies 855 running on steam are directed to provide engine torque, and one piston assembly, using hydrogen, performs other work or functions. It should be clear that other such combinations of the energy sources and piston numbers are possible.

Figure 9:
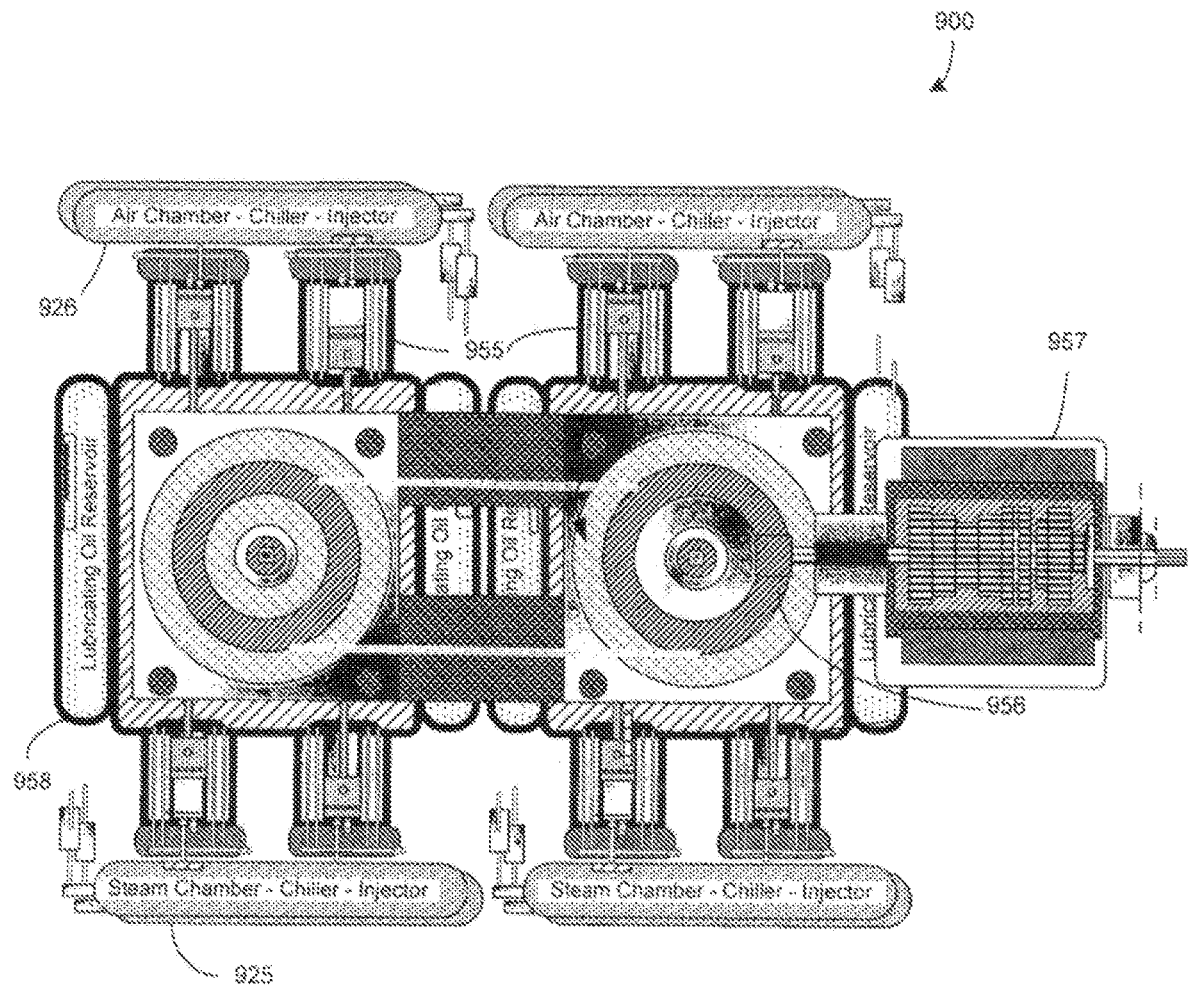
FIG. 9 is a bottom view of an eight cylinder engine embodiment of the present invention, employing two of the engines of FIG. 8 in tandem.

With reference now to FIG. 9 of the DRAWINGS, there is illustrated another embodiment of the present invention, designated generally by the reference numeral 900, in a bottom view. Indeed, this embodiment combines two of the four-cylinder engines 800 of FIG. 8 into a tandem, eight-cylinder configuration. As illustrated, eight piston assemblies 955 are in operation, the top half employing compressed air energy, delivered by the air chambers 926, and the lower half employing by steam generation, with the steam delivered by the steam chambers 925. Lubricating oil reservoirs 958 prevent friction. It should be understood that multiple such configurations are possible to create larger tandem engines.

As described, the modular design of the engine of the present invention permits multiple energy production units for insertion into the engine, e.g., multiple type fossil fuels, electric hydrogen energy, pneumatic energy and steam energy units can be employed, and under processor 230 control dynamically selected automatically or manually to perform work, despite the disparate energy source generation. Furthermore, the present invention permits operation of a second engine in a tandem or parallel arrangement within one or more engine embodiments using one or more of same energy types, including the aforementioned multiple type fossil fuels, electric hydrogen, pneumatic and steam energy. In particular, a single automatic transmission 957 realizes torque produced by both four-cylinder engines due to their synchronous operation and conjoinment, as illustrated and described further in connection with FIG. 10. It should further be understood that read drive shafts and belt pulleys aid the transfer of power for the total load. Tandem engines, such as one illustrated in FIG. 9, are preferably under common microprocessor 230 control through a common digital operated bus, such that one controller is in control of two individual units, except the primary processor 232 preferably has control of all engine operating systems and embodiments. As discussed, portions of respective engines may act individually, with the remaining pistons acting in concert.

Figure 10:
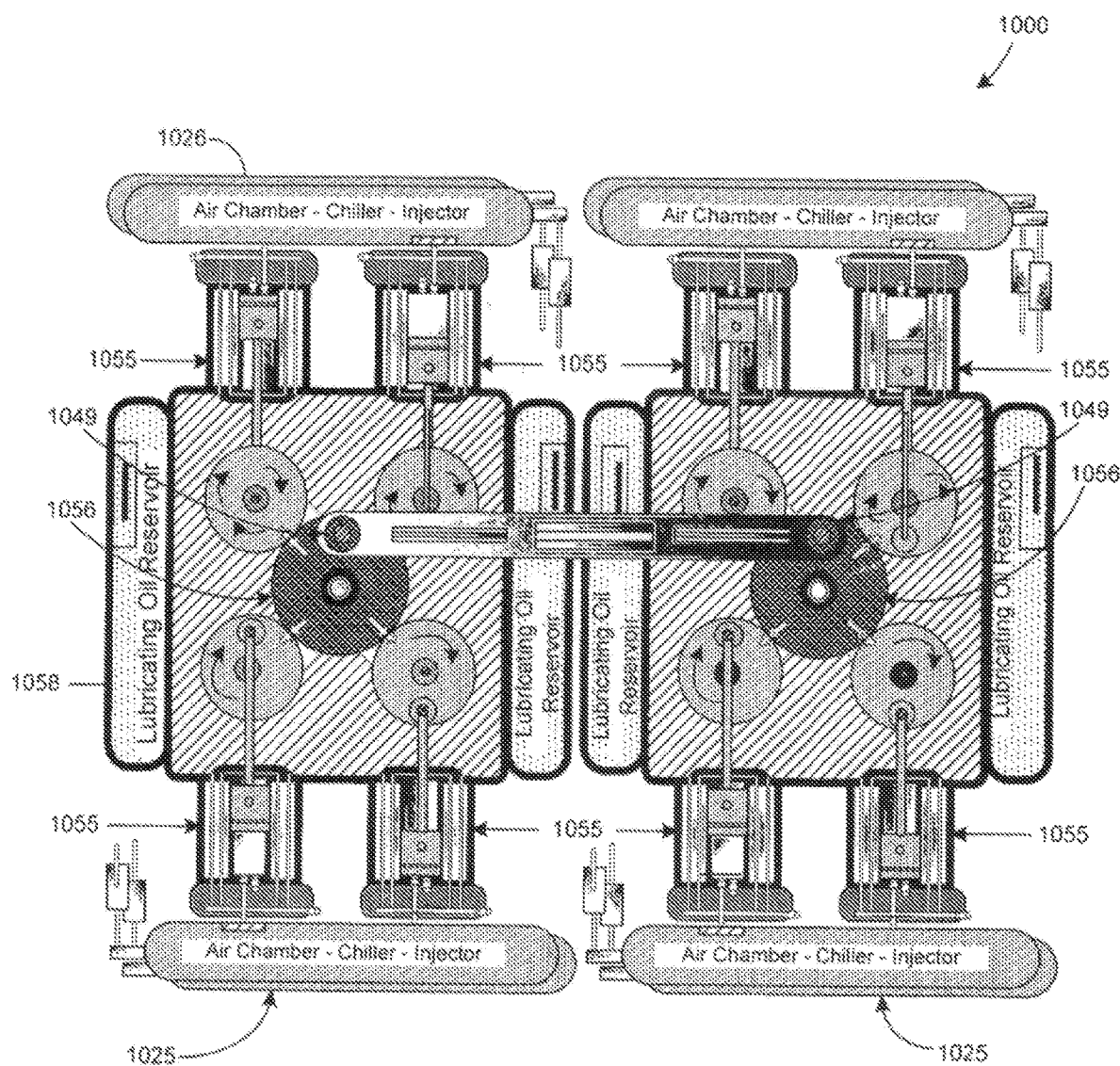
FIG. 10 is a top view of the embodiment shown in FIG. 9.

With reference to FIG. 10 of the DRAWINGS, there is illustrated a top view of the engine set forth in FIG. 9, i.e., a tandem, eight-cylinder engine configuration, generally designated by the reference numeral 1000. As shown, the pistons 1055 are powered by both compressed air and steam, but other energies are possible as described. As illustrated, the pistons 1055 are each connected to respective engine thruster gears 1048, via respective thruster rods 1047, which convert the reciprocal piston motion to rotational energy, e.g., the clockwise motion of the gears 1048 and extended and non-extended rods 1047, illustrated in FIG. 10. The gears 1048 are connected to respective cylinder heads 1056, which have a tandem crank arm 1049 affixed therebetween. The two engines 800, therefore, operate as one due to the tandem crank arm 1049, which interconnects and interworks the cylinder heads 1056 to operate as one, as is understood in the art. Indeed, all eight pistons and cylinder stages 1055 in the tandem engine 1000 so configured work together in synchronous mode.

Again, due to the modular design aspect of the present invention, multiple energy production units, multiple type fossil fuels, electric hydrogen energy, pneumatic energy and steam energy may be employed in this embodiment, with processor control selecting therebetween automatically or manually, operating the engine 1000 in tandem or parallel and individual pistons 1055 with particular energy sources may be employed in other endeavors than directly powering the engine.

Figure 11:
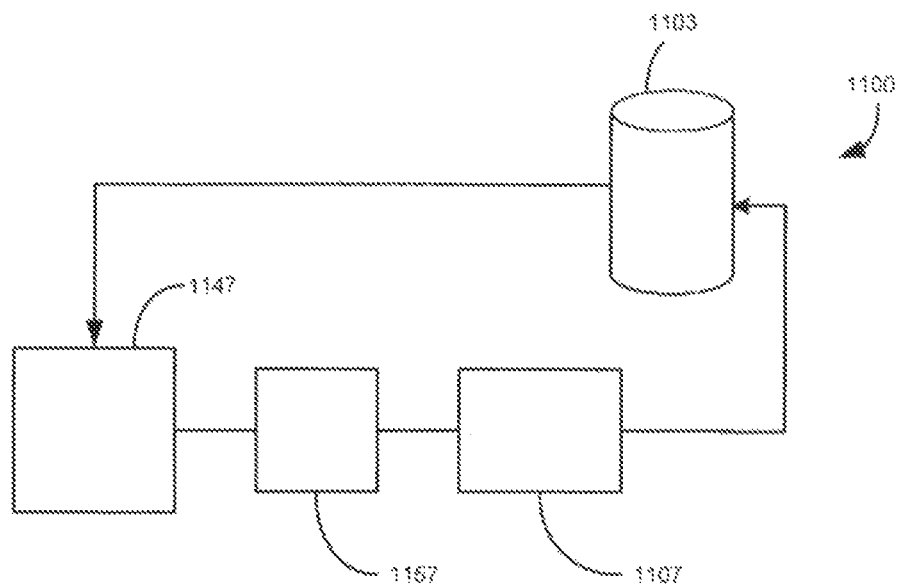
FIG. 11 is a diagrammatic view of the four cylinder engine embodiment shown in FIG. 8 with pneumatic compressors and compressed air storage tanks.

With reference now to FIG. 11 of the DRAWINGS, there is illustrated a diagrammatic representation of another embodiment of the present invention, wherein a pneumatic compressor 1107 is operational, the embodiment generally designated by the reference numeral 1100. An engine 1147 is shown, which can constitute either of the aforementioned four and eight cylinder configurations set forth in the FIGURES hereinabove. Also shown is an automatic transmission 1157 connected to the engine 1147 and the pneumatic compressor 1107, which, as discussed, is powered by electricity. As is understood, the mechanical energy generated is converted to electrical energy for use. Storage of pneumatic energy can be done above or below earth in high pressure storage tanks 1103. It should be understood that the pneumatic compressor is preferably of auger type.

As also illustrated in FIG. 11, pneumatic lines 1103A from the tank 1103 feed chilled air to the engine 1147, cooling heat generated within the engine 1147. In this fashion, the system 1100 can provide coolant for the operations for the components therein, principally the engine 1147, but all components in the system may be so cooled. With fluids freezing and the fluidic passages becoming gummed up or blocked due to impurities, the instant embodiment provides a convenient way to eliminate this problem, allowing the device 1100 to operate in very cold and/or very hot environments.

With further reference to FIG. 11, it should be understood that the configuration permits the engine 1147 to adapt from two to four piston-cylinder stages and individual piston-cylinder assembles or groupings thereof can be made operable or be placed in idle mode, automatically or manually, under software control, i.e., the processors 230. It should be understood that with the automatic transmission 1157 gearing, the total load placed upon the generator may be in the megawatts production range. Thus, the configuration 1100 operates to provide industrial loads for standby power in case AC electric primary grid power were to fail or to add efficiency to supplement peak loads off power grid during periods of high energy rates. It should also be understood that a power generator or other device connected to the system 1100 can be air cooled from the pneumatic sources developed by the engine system itself. This cooling has a benefit in lowering the loss inside the windings of the generator, such as when operating under heavy loads or when the engine generator environment experiences extremely high temperatures. With storage of the tanks 1103 underground, this aids in keeping the stored air cooled.

Figure 12:
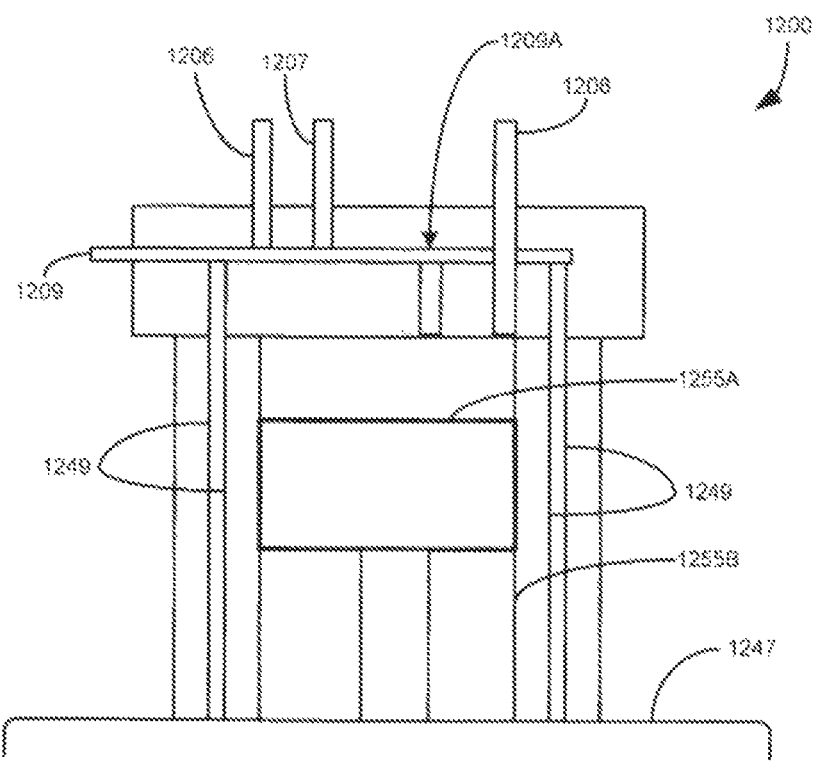
FIG. 12 illustrates a piston/cylinder assembly pursuant to the present invention with multiple energy source inputs.

With reference now to FIG. 12, there is illustrated a representation of a piston/cylinder assembly 1255 for an engine, generally designated by the reference numeral 1200. As shown, piston 1255A moves reciprocally within a cylinder 1255B, generating mechanical energy transferred to the aforementioned engine thruster gears 1048, via thruster rods 1255C, and then on to the automatic transmission and other devices, as described hereinabove and understood in the art. The advancements of the present invention permit multiple and diverse energy sources being used within the assemblies 1255. To accomplish this, these energy sources must be supplied. Shown in FIG. 12 are a steam injection line 1206, a hydrogen injection line 1207, a fossil fuel injection line 1208, and a compressed air injection line 1209, providing the four types of energy sources described herein. It should, of course, be understood that alternate and future energy sources may also be employed pursuant to the principles of the present invention.

As discussed hereinabove in connection with FIG. 11, another aspect of the instant invention is to provide alternative air cooling for the engine 1247. The compressed air injection line 1209 provides cooled air (e.g., from the tanks 1103 in FIG. 11) to cool the engine 1247, with cooling conduits 1249 extending down into the engine 1247 and dispersed therein, as is understood in the art to provide the requisite cooling. Another conduit, designated generally by the reference numeral 1209A, however, connects the compressed air injection line 1209 to the piston assembly 1255, providing the alternative for compressed or pneumatic air power generation, as described.

Figure 13:
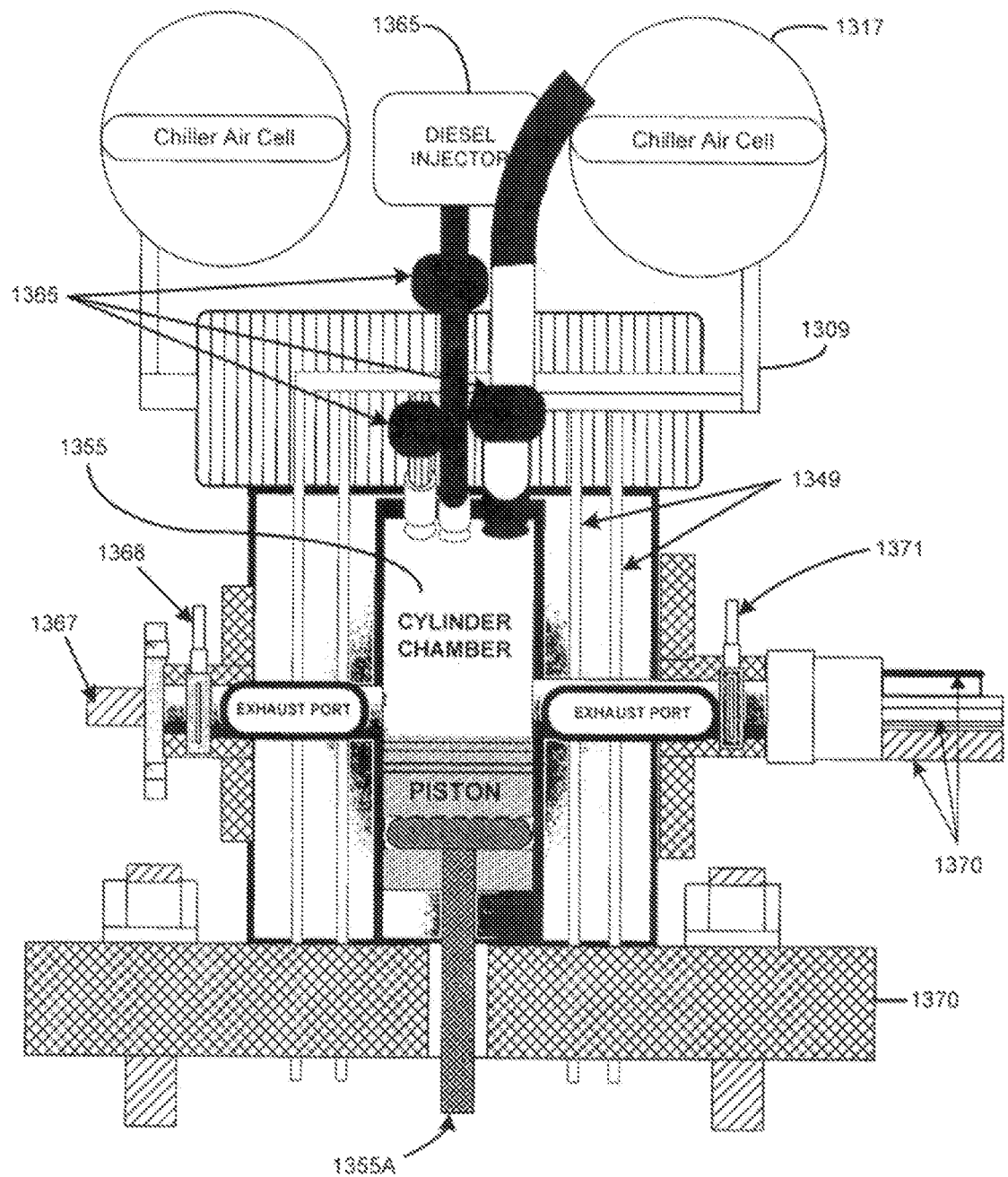
FIG. 13 is a further illustration of a piston/cylinder assembly, as shown in FIG. 12, in an engine.

With reference now to FIG. 13 of the DRAWINGS, there is illustrated the engine cylinder/piston assembly 1255, as shown in FIG. 12, further depicting ports for various energy sources and exhausts, and generally designated by the reference numeral 1300. In particular, an engine head assembly, generally designated by the reference numeral 1301 has a number of cylinders and pistons, generally designated by the reference numeral 1355, in head fit to adapt to any one of four named available energies, i.e., multiple type fossil fuels, electric hydrogen, pneumatic energy and steam energy. As shown, the top of cylinder 1355 has a variety of injectors positioned to supply the variety of energies or fuel pursuant to the present invention. These injector ports are generally designated by the reference numeral 1365 and represent the aforementioned types of energies, including steam, hydrogen, pneumatic and fossil fuels. A fossil fuel injector, such as a diesel fuel injector 1366, is illustrated. Pneumatic air chiller cells 1317 are also shown, with a compressed air injection port 1367 to supply pneumatic energy to the engine, particularly the piston/cylinder assembly 1355. As described in more detail with FIG. 12, the chiller 1317 also supplies cooled compressed air to the engine for cooling through a compressed air injection line 1309, which provides alternate cooling means for the engine through cooling conduits 1349 passing through those engine portions subject to heating. It should, of course, be understood that the injector ports 1365 include steam and hydrogen injector ports as well, as generally illustrated, although out of the plane of the figure.

Upon consumption of the injected energies or fuel into the piston/cylinder assembly 1355, the contents are, of course, ejected, and the assembly primed for the next infusion of fuel. A diesel exhaust port 1367 removes the fossil fuel remnants from the fuel chamber 1055, and the processor 230 monitors and controls the relevant exhaust gates through a control valve 1368, e.g., the valve 1368 opens the exhaust port 1367 upon combustion completion and closes the gate before the next cycle begins, the entire course of a cycle being milliseconds long. With further reference to FIG. 13, on the other side are other exhaust ports, generally designated by the reference numeral 1370 for the exhaust products of steam, pneumatic air and hydrogen. As described hereinabove, all of these respective used energies are sent for recovery and recycling, e.g., to a turbine generator.

It should be understood that in any one or several piston-cylinder assemblies 1355, such as the fossil fuel stage, may differ in size compared to others. Nonetheless, the piston assemblies 1355 can shift or change between the different energy sources through software and/or microprocessor control, while the engine operates in synchronous modes.

It should further be understood that the entire head and cylinder block assembly 1301 of the present invention is preferably constructed of one solid piece of metal, such as a combination of titanium, Stainless Steel and nickel. As described, the integral assembly 1301 includes means to apply cooled air therein, e.g., the aforementioned conduits 1349 and/or air attached vortex tubes having air flow to cool the cylinder head in place of conventional liquid coolants. The aforementioned chiller air storage tank 1103 (connected to the chiller 1317) includes various air ducts or conduits 1349, and via microprocessor 230 control, these conduits or ducted gates, when opened, send chilled air into the engine for cooling and for energy generation. It should be understood that this cool air injection into the piston chamber 1355 affects the oxygen furnished for ignition of gases in the cylinder chamber, particularly for fossil fuels, in that when the piston approaches top dead center (TDC), the cold air enhances the power stroke efficiency since colder air has more molecules per square inch.

With further reference to FIG. 13, there is shown another feature of the present invention. In particular, the piston and cylinder assembly 1355 of the instant invention operates without conventional engine type cam shafts, an arrangement typical with designs of gasoline or diesel fuel operated engines.

Assuming that port 1370 is for steam, the operation of the invention depicted in FIG. 13 is now described. A steam valve injection port 1365 opens and closes, under managed timing of the programmed microprocessor 230, and steam pressure is applied inside the piston cylinder 1355, where after the piston is at or near top dead center, the steam is injected through the steam injector 1365. The high temperature and pressure steam then applies pressure, pushing on said piston and all other surfaces inside the piston chamber, including the top of the piston chamber and side walls of the cylinder. The piston and the attached piston rod, both designated by the reference numeral 1355A, extending to the engine thruster gear 1048, described in more detail in connection with FIG. 10, now start to rotate in a circular motion, and the piston is forced downward from top dead center (TDC) about 2 degrees off TDC to about 80 degrees during the piston's power stroke. As discussed, the timing of the steam exhaust port 1370 opening is controlled by the master microprocessor 230 through positioning sensors that tell the exact position of the cylinder 1355 relative to the exhaust port 1370, and the exact location of the piston relative to the piston stroke of engine operation. Due in part to the drag leveraged onto the engine when the piston power stroke is completed, the microcontroller 230 senses the drag position and turns on electromagnets to give thruster gear 1048 attached to the piston pushrod 1355A a boost or insertion of electromotive energy to attract electronic magnets and assist the engine drag force to return the piston to near the top of the TDC in the piston chamber housed inside the cylinder assembly. This electromagnet boost is described further hereinbelow.

It should be understood that the cylinder and piston 1355 design requires construction materials of highest strength to survive the high cylinder chamber pressure achieved in operation of the present invention, exerting pressure on the sides of the cylinder. The advantages of making the assembly out of a single piece make these high pressures possible. As discussed, through the cooling conduits 1349, temperatures are well controlled in the cylinder head area 1301, with pneumatic chilled air manufactured onboard the engine. Of course, electric pneumatic compressors may also be used, as optional emergency backup supply when larger amounts of cooling are quickly required, even though the engine manufactures this pneumatic source in abundance for one mode of engine operation.

Another feature of the present invention is a laser scattered beam that injects heat in many areas of the cylinder 1355 to cause fossil fuel and electric hydrogen energies to ignite, as would other fossil fuels with use of a conventional spark plug. Accordingly, laser energy may be ported into the cylinder 1355, e.g., via an input port 1365, providing a laser energy conduit to the chamber. This feature chooses laser heat to cause ignition of gases of all sorts used herein. The core master controllers 232 and 230, sensors and feedback circuits preferably operate at every operational level within the engine provide the necessary feedback on functional activity to operate the engine efficiently, with safety first to the overall operation. The preferred cylinder/piston 1355 design withstands a wide range of environmental conditions worldwide, ranging from extreme cold to extreme hot temperatures.

Figure 14:
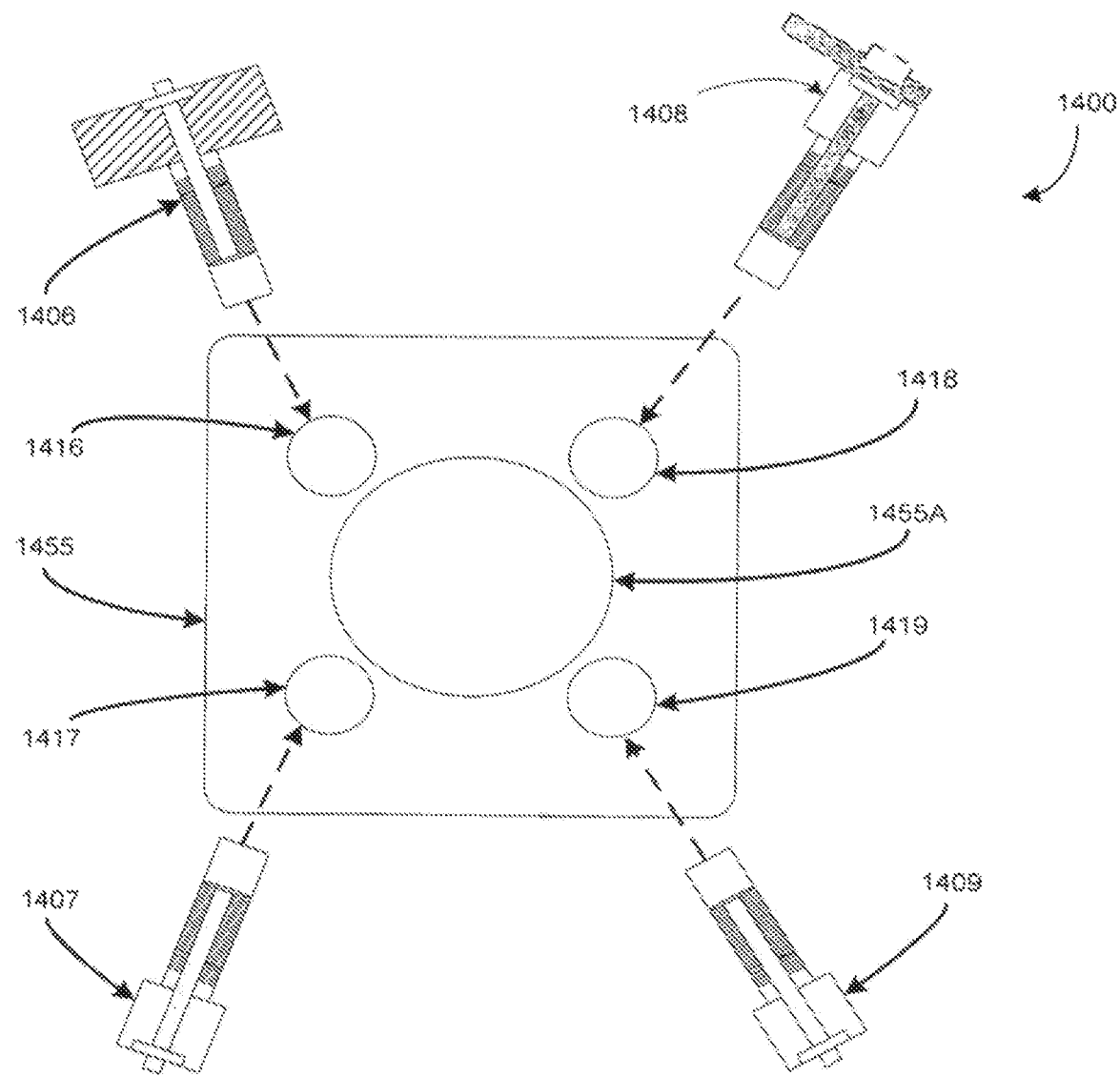
FIG. 14 is a top view of a cylinder head, illustrating multiple energy generation source input ports.

With reference now to FIG. 14 of the DRAWINGS, there is illustrated a top view of a cylinder head embodiment pursuant to the present invention, generally designated by the reference numeral 1400. A cylinder head 1455 has one operating piston and one cylinder, generally designated by the reference identifier 1455A, but, pursuant to the instant invention, each such head is equipped to receive four different type energy injectors, for example, independent injectors for steam energy 1406, hydrogen energy 1407, fossil fuels 1408 and pneumatic energy 1409 to inject the selected type energy or specific energy to the combustion chamber. Each injector is inserted into the respective ports, i.e., ports 1416-1419 for injectors 1406-1409, respectively. Although only one injector or energy type can be selected for use at a given time for a given head 1455, the choice of changing the energy source dynamically is done pursuant to processor 230 controls or manually, as described hereinabove and hereinbelow.

With further reference to FIG. 14, it should be understood that a redundant steam injector 1406 (or other injector) can be equipped where backup is required. It should further be understood that one or two similar injectors can be operated together to achieve high degree of redundancy or may operate apart as one injector and fuel source on line at a time until such failure were to occur wherein the standby injector and fuel source would come on line and operate.

With further reference to FIGS. 8-10 and 12-14, the mechanical piston and cylinder elements shown each have one, two, three and four extractor gates pursuant to the present invention. During operation, all except one extractor gate will be activated in closed or locked position, and one will activate or operate open and closed in a strictly timed and sequential order to block the extractor port allowing energy to be contained during piston movement downward in strict timed movement period. As discussed, one of the energy injectors opens and allows energy of choice into the cylinder well, and within milliseconds or microseconds will close and lock the piston well shut. As the piston moves downward to a specified predetermined position, a specific microcontrolled extractor gate opens to allow the extraction of spent (used) energy gases remaining in the cylinder well after said spent gas or spent energy has reached the end of the piston driven energy stroke downward.

Figure 15:
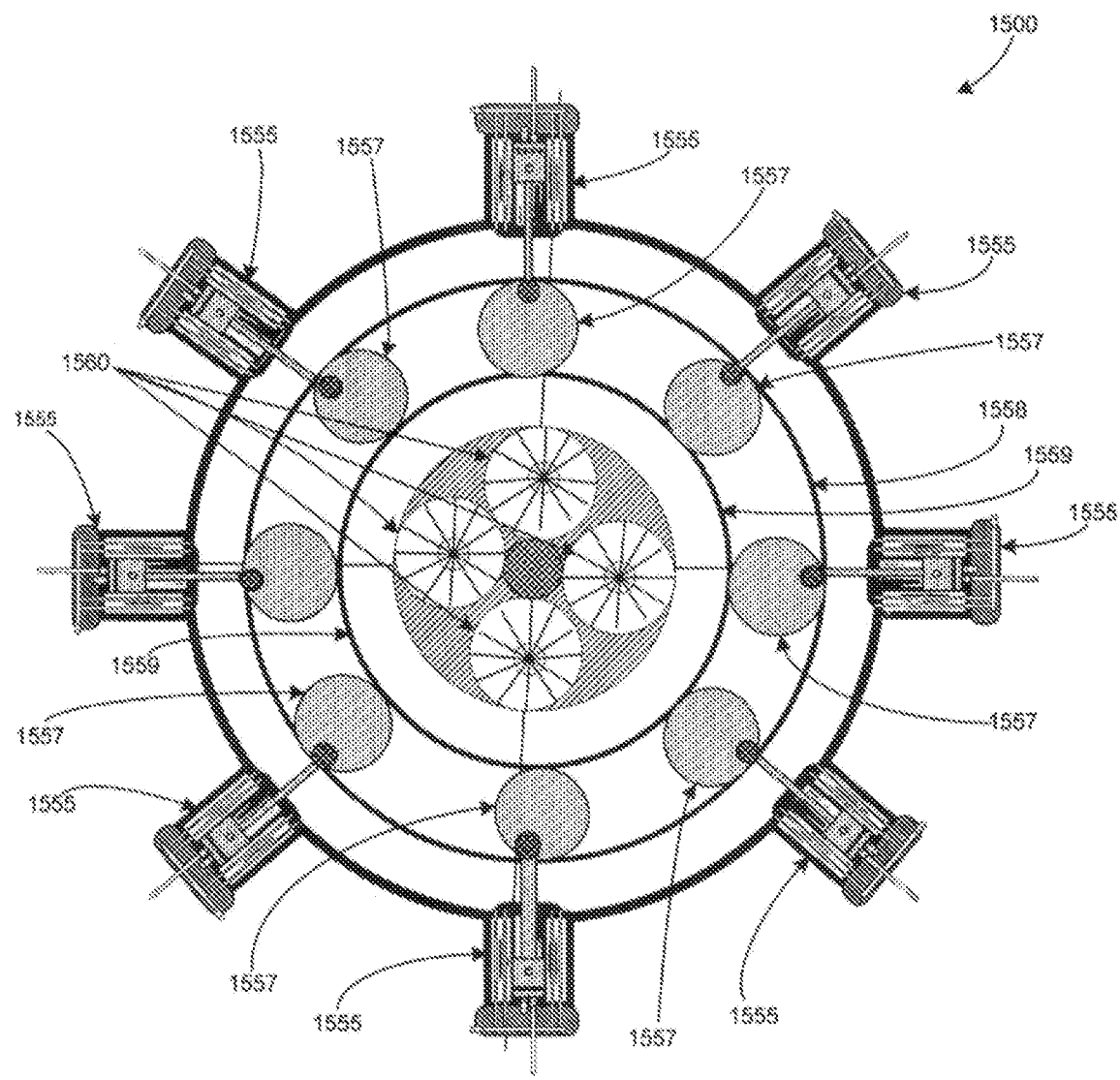
FIG. 15 illustrates a radial configuration pursuant to the present invention.

With reference now to FIG. 15, there is illustrated a configuration where piston and cylinder assemblies 1555 are arranged along the rim of a mechanical circular geared mechanism, generally designated by the reference numeral 1500. As with the other embodiments, the various arrayed piston assemblies 1555 each operate in strict accordance with engine processor 230 managed timing, i.e., in chronological order so each piston-cylinder assembly 1555 can function to contribute work. As shown in FIG. 15, the radial engine 1500 has a plurality of the piston assemblies 1555 each with a connecting rod 1556 extending inward and attached to a geared off set thruster gear 1557, which mates within a large inter-gear 1558, which attaches to all thruster gears 1557. In this way, the piston power rotating the thruster gears 1557 contributes to power the rotation of the inter ring gear mechanism 1559 and a shaft, drive or other gears therein, designated by the reference numeral 1560, to power a device, such as an electric generator or pneumatic compressor. It should be understood that this arrangement 1500 allows every piston assembly 1555 therein to add its power to help rotate the inter-gear 1558, providing a new methodology for adding multiple engine stages to power large loads in a small space and use multiples of different types of energy to fuel the operations.

As shown hereinbefore and in FIG. 15, the configurations of the present invention, including this radial configuration are made to work by injecting any one of the aforementioned four types of energies. Each of the piston assemblies 1555 are controlled individually and together by software configured for optimal operations, and energy is injected into each piston assembly and each are operated in strict accordance with engine processor managed timing. All of this results in an increase of overall additional foot pounds to meet demands for larger workloads that are placed upon the engine. In contrast to the arrangement set forth in FIG. 15, large pneumatic compressors can be rotated with constant speed to generate pneumatic energy, e.g., screw type auger compressors. The present invention describes and illustrates a new method of adding multiple engine stages to power large loads in a small space and use multiples of different types of energy to fuel their operation.

It should be understood that two or more of the radial configurations 1500 shown in FIG. 15 can be coaxially aligned, and connected to a power generator or other device, such as the pneumatic compressor.

Figure 16:
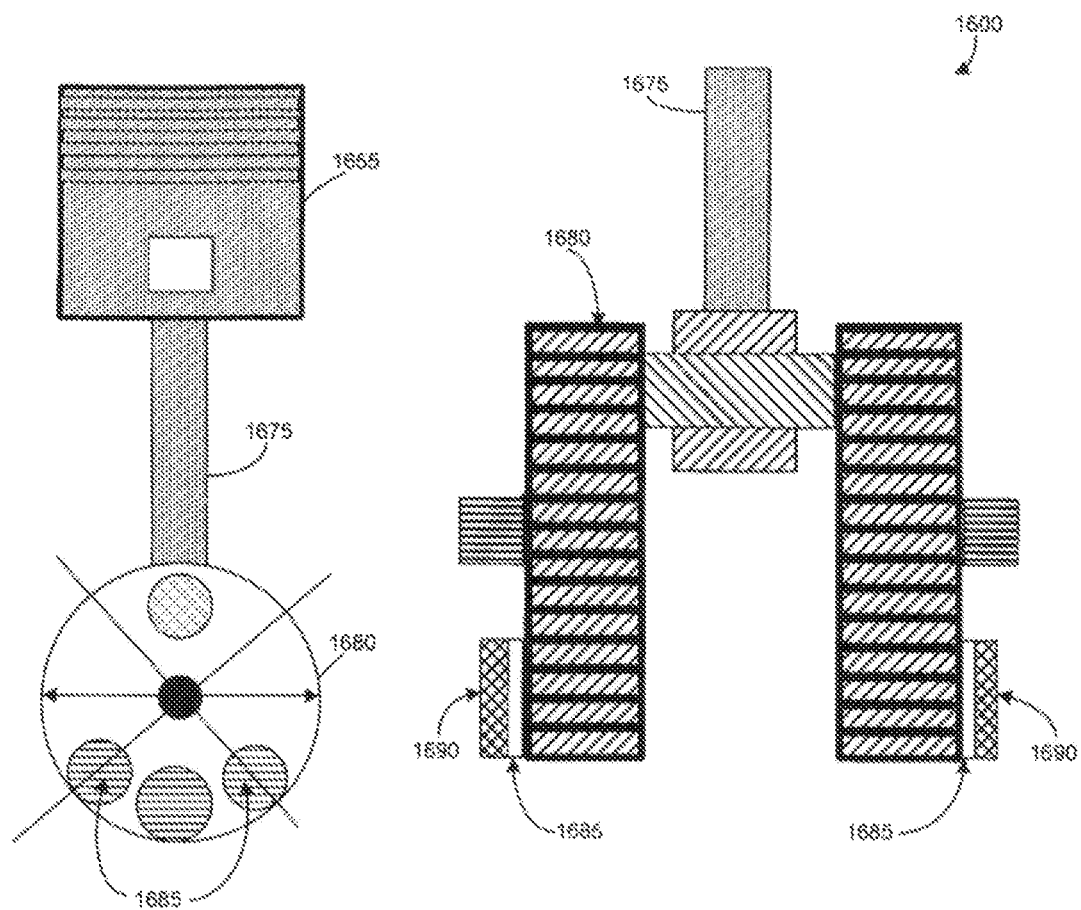
FIG. 16 illustrates a magnetic boost embodiment for assisting engines.

With reference now to FIG. 16 of the Drawings, there is illustrated another improvement of the present invention, generally designated by the reference numeral 1600. As described in FIG. 15 and in connection with the earlier embodiments, the piston rod extends downwards and engages various gears to effectuate power transference, as is well known in the art. As shown in FIG. 16, a piston assembly 1655 has a piston or thruster rod 1675 extending downwards and engaging thruster gears 1680. Along the outer sides of the thruster gears 1680 magnets 1685 are affixed, positioned approximately 180 degrees from where the thruster rod 1675 mates with the thruster gear 1680, as shown in both view of FIG. 16. As the piston 1655 moves up and down inside the cylinder wall, the piston power stroke is realized between 5 degrees and 130 degrees off top dead center, and the thruster rod 1675 rotates through an angle where the piston becomes a drag or more friction. At this point, the processor 230 realizes this position and induces a repelling voltage within adjacent electromagnets 1690, such that the magnets 1685 affixed on the thruster gear 1680 are energized by the electromagnets 1690, which are affixed separately to a supporting wall. Due to the close proximity, this inducement causes the fixed magnets 1685 to repel away from the electromagnets 1690, and the magnetic repulsion helps the engine by overcoming the aforementioned friction during the stroke, assisting the cycle with a boost.

As described in the various embodiments set forth herein, the primary objective of this invention is to provide new and improved engine technology, allowing the synchronous production of three clean energy sources within an engine and operating on any one or any of three clean energy sources. Another aspect of the present invention combines the above with multiple type fossil fuels type energy, all being contained in one engine embodiment. As discussed, it should be understood that additional, alternative and future energy sources may also be employed.

In addition to converting hydrogen and steam energies, the present invention is directed to the improved conversion of one or more clean energy sources, as well as multiple type fossil fuels. The present invention is also directed to energy conservation and reuse, such as the reuse of hydrogen, steam and pneumatics and the energy generated by it (as a matter of cogeneration or parallel generation).

The present invention also includes improvements in the design of a self, internally-generated cold air (0 to −50 F degrees) cooling and heating systems, which offset requirements for liquid engine cooling in harsh environments and provides another mechanism to conserve and reuse energies.

In a preferred embodiment of the invention, an engine employing multiple type fossil fuels, electric hydrogen energy, pneumatic energy and steam energy includes one or more of the following adaptations or combinations thereof: induction heating; sensors to monitor temperatures of gases and liquids, automatically or manually adjusting same; employing motion sensors and processors to determine how and when to regulate the circulation of the gas and/or fluid and pneumatic energies, opening and closing input and exhaust gates, meeting the variable demands of the engine operation; and recovery of spent or used energies, such as pneumatic energy to spin a turbine to produce electricity as a byproduct.

As described, photovoltaic cells or wind driven generators or electric power grid supplied sources may be employed to augment or initiate operations of the present invention, e.g., through batteries.

As discussed, the present invention employs a modular design that permits multiple energy production units, multiple type fossil fuels, electric hydrogen, pneumatic and steam energy to be selected automatically or manually and operate engine cylinders and pistons in tandem or parallel arrangement within one or more engine embodiments using one or more of same energy types including multiple type fossil fuels, electric hydrogen, pneumatic and steam energy. Further, the design herein is a modular design that permits some energy production units to operate while others idle or perform work by driving attachments to generate electrical energy or pneumatic energy or electric hydrogen or steam energy, and employs sensors and processors to determine load and whether to engage or idle units in an engine, automatically or manually.

To facilitate manufacturing and modularity, the present invention employs an individual common piston and cylinder stage design, employing methods of using multiple type fossil fuels, electric hydrogen, pneumatic and steam injectors and extractors, and associated discharge ports for each energy production unit operated, permitting all of these devices to be engaged independently of each other on the same common cylinder and piston embodiment, and among several individual cylinders and individual embodiments controlled through local or remote software management.

In addition, the present invention preferably employs redundant processors to control the sensors and operations of the engine and its constituent energy production units, thereby providing more safety in timing and operations. This control permits one or more energy production units to generate electricity, electric hydrogen, pneumatic and steam energy as output to perform work, while permitting energy production units within the engine to generate electricity for the operation of the engine, allowing production units within an engine (or in engines operating in tandem) to share load and assume additional load if one or more energy production units fails, and where the control computers permit automated control of any single type of energy source.

It should be understood that the phrase "energy production unit" as used above includes any mechanical system that may be used to convert one form of energy to another (heat to mechanical energy, for example, or heat to mechanical to electrical energy). A piston and cylinder stage in the engine with several other piston and cylinders is one form of energy production unit, a turbine is another, and a pneumatic air motor is yet another, as well as the aforementioned circular turbine energy production unit discussed in connection with FIG. 15.

The principles of the present invention can be utilized to generate mechanical or electrical power (or both in tandem), to drive any stationary or mobile machinery, vehicles, trucks, tractors, earth moving machinery and motorcycles or scooters or boats and airplanes in any size and form, operated on land or on the water or under water, and can serve as a local electrical power or electric hydrogen energy or pneumatic energy or steam energy source for industrial applications, including manufacturing or residential electric, cooling and heating applications.

Further, an engine operating with the multiple energy sources may employ an automatic transmission positioned between the engine and load to achieve geared ratios and constant controlled operating speed, regulating engine load and speed proficiently when loads on the engine vary from no load to light load to heavy working loads. Also, the engine load can be set to run at any optional gear having settings for constant rotation speeds where the engine varies from one of four or combination of the aforementioned four energy sources to operate with variable load ratios and variable fuel or energy sources input to a piston-cylinder stage.

As illustrated, the present invention permits a single mechanical piston and cylinder head stage to have one, two, three, four or more independent energy injectors for selection and operating any one of four or more separate energy sources selected to inject energies, on manual or automatic basis. Further, each engine cylinder-piston may operate independently of another cylinder-piston stage when energy sources are selected, such as fossil fuels in cylinder one, pneumatic energy in cylinder two, steam energy in cylinder three, and electric hydrogen energy in number four, all operating to perform work through in service performance on these four separate energy sources. Also, all of these operations are coordinated and performed pursuant to the exacting management of an engine central microcontroller processor control and monitoring system, as set forth herein.

In another embodiment, it should be understood that the aforementioned mechanical circular geared mechanism is an integral part attachment with several piston and cylinder assemblies, each of which work by injecting any one of four types of energies, as described. It should further be understood that particular piston units may be individually selected, and energy is injected into each cylinder well, all in strict accordance with engine processor managed timing of all cylinder-piston units attached to the circular geared mechanism in mechanical and chronological order so each piston-cylinder embodiment can function to contribute work, resulting in an increase of overall additional torque foot pounds to meet demands for larger workloads being placed upon the engine.

As described, cooled compressed air, such as ducted from pneumatic vortexes and from cold generators, is fed throughout the engine cylinder and piston chamber orifices directed for cooling the engine, avoiding the use of water or liquids to cool the hot temperatures resulting from combustion of multiple type fossil fuels or other hot temperature resulting from engine operations with steam energy, pneumatic energy, electric hydrogen energy and other energies. Also, the compressed air is regulated to flow through each piston-cylinder assembly, having controlled chilled air flow done under the direction of core microprocessor software to maintain a predetermined set level per type energy used.

In the radial arrangement, any number of piston-cylinder assemblies may be arrayed in circular formation, generally placed in idle mode, automatically or manually under software control, and may power one or more model auger type compressor stages.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A modular multiple clean energy engine comprising:
   a plurality of cylinders, wherein each said cylinder is configured to receive and combust a respective clean energy source,
   said respective clean energy source being selected from the group consisting of hydrogen gas, compressed gas and externally generated steam, said clean energy source driving respective pistons, said respective pistons coupled to a transmission; and
   a processor, said processor configured to coordinate the release of said hydrogen gas, said compressed air, and said externally generated steam to respective cylinders, wherein said processor selectively operates to provide power to said engine from at least two of said plurality of cylinders acting substantially in unison.

2. The modular multiple clean energy engine according to claim 1, further comprising:
   another cylinder, said another cylinder is configured to receive and combust a fossil fuel, driving another piston.

3. The modular multiple clean energy engine according to claim 2, wherein said processor selectively operates to provide power to said engine from at least two of said plurality of cylinders and said another cylinder acting substantially in unison.

4. The modular multiple clean energy engine according to claim 2, wherein said processor selectively operates only one of said plurality of cylinders and said another cylinder to provide power in an individual mode.

5. The modular multiple clean energy engine according to claim 1, wherein said processor selectively operates only one of said plurality of cylinders to provide power in an individual mode.

6. The modular multiple clean energy engine according to claim 1, further comprising:
   a turbine, said turbine being driven by exhaust from at least one of said plurality of cylinders.

7. The modular multiple clean energy engine according to claim 6, further comprising:
   another piston in another cylinder, said another piston being driven by the combustion of fossil fuel,
   wherein said turbine is driven by exhaust from at least one of said plurality of cylinders and said another cylinder.

8. The modular multiple clean energy engine according to claim 1, wherein said engine drives one of an electric generator or a vehicle.

9. The modular multiple clean energy engine according to claim 8, wherein said vehicle is selected from the group consisting of trucks, tractors, earth moving machinery, motorcycles, scooters, boats, submarines and airplanes.

10. The modular multiple clean energy engine according to claim 1, further comprising:
    a compressor, said compressor providing compressed air to a respective cylinder.

11. The modular multiple clean energy engine according to claim 1, wherein said plurality of pistons in respective cylinders are arrayed in a radial configuration.

12. The modular multiple clean energy engine according to claim 1, further comprising:
    energy recovery means to recover energy from said plurality of cylinders in operation of said engine.

13. The modular multiple clean energy engine according to claim 12, further comprising:
    a turbine, said turbine receiving the recovered energy from said plurality of cylinders, and transforming said recovered energy.

14. The modular multiple clean energy engine according to claim 1, wherein each of said plurality of cylinders have respective inputs configured to selectively admit said respective energy source, a first said input configured to selectively admit hydrogen gas, a second input configured to selectively admit compressed air, and a third input configured to selectively admit externally-generated steam.

* * * * *